April 12, 1960     J. STROGAN     2,932,475
VEHICLE AIR HOSE SUPPORT
Filed May 9, 1958     2 Sheets-Sheet 1
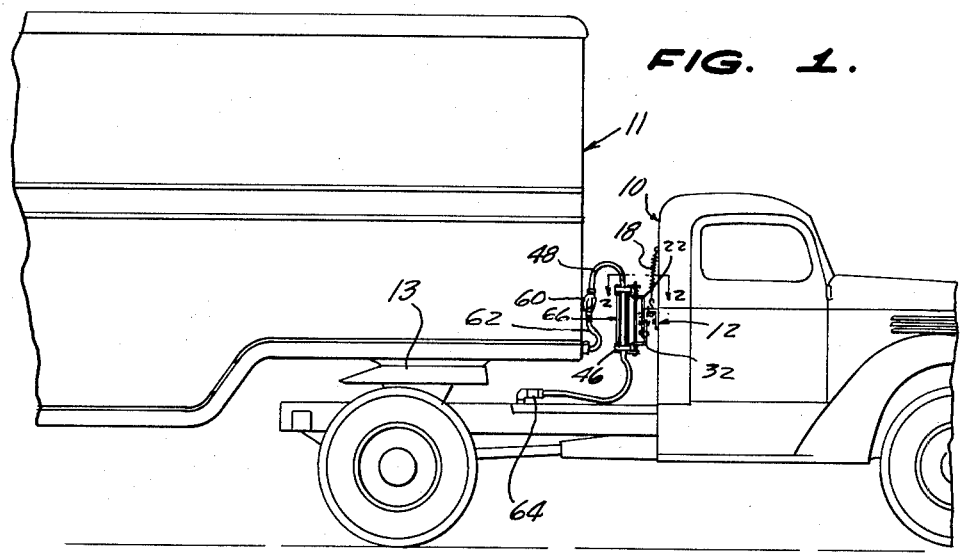
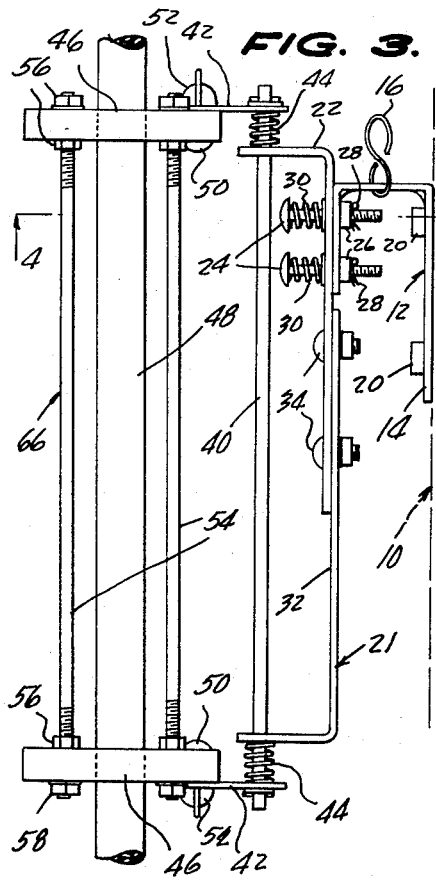
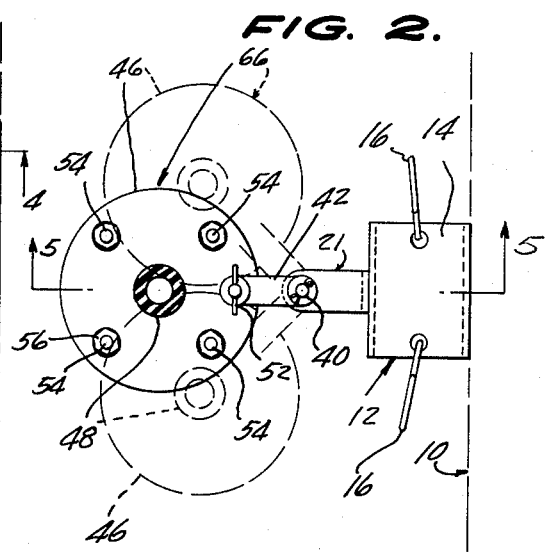
INVENTOR.
JOHN STROGAN,
BY
McMorrow, Berman + Davidson
ATTORNEYS.

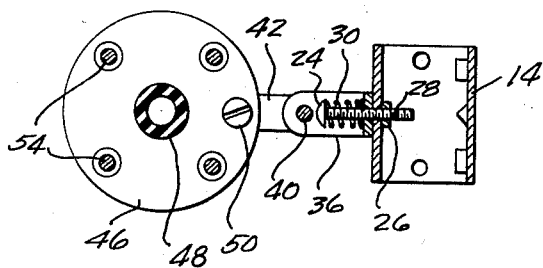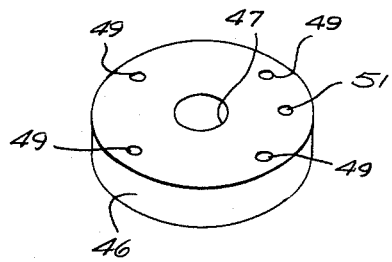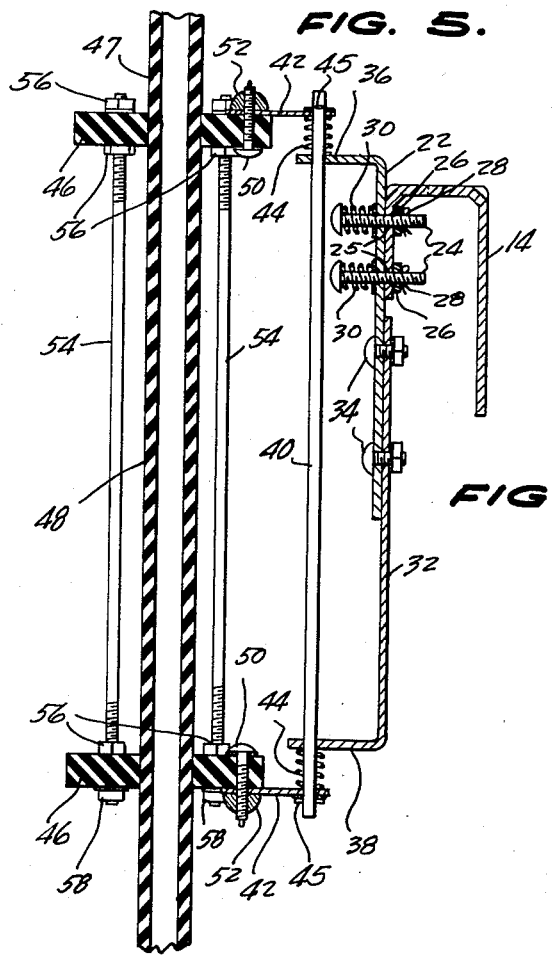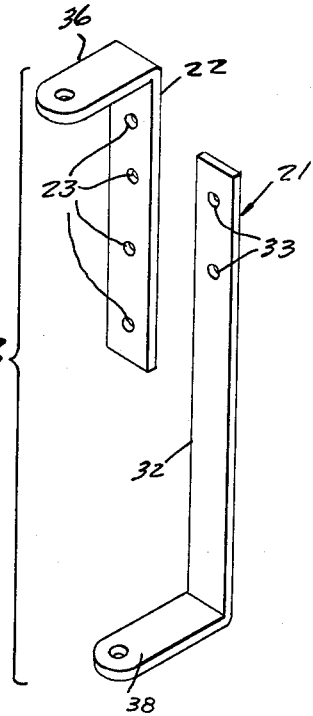

United States Patent Office

2,932,475
Patented Apr. 12, 1960

2,932,475

VEHICLE AIR HOSE SUPPORT

John Strogan, Parkesburg, Pa.

Application May 9, 1958, Serial No. 734,163

6 Claims. (Cl. 248—54)

This invention relates generally to equipment for tractor-trailer truck rigs.

A rig of the type stated includes a tractor having an air hose connectible to the air line of the trailer. The hose extends between the leading end of the trailer and the back of the cab of the tractor.

There is a continuing problem of keeping the air hoses from rubbing against the back of the tractor. This problem is produced by reason of the fact that the connection between a tractor and a trailer is, in actuality, a pivoted connection so that there is continual relative pivotal movement of the tractor and trailer. This causes continual flexing of the hose, which of course extends from the tractor to the trailer. The flexure of the hose in turn causes the hose to be moved about and in this way rubbed against the tractor.

The compressed air which passes within the air hoses is of course maintained under heavy pressure, and it will be observed that the continual rubbing of the hose, which rubbing tends to occur at the same location, may quite possibly produce a weak spot. This weak spot may rupture under the heavy internal pressure. This produces a dangerous situation, as will be readily appreciated. Even in instances in which the continual rubbing does not cause rupture of the air hose, there is a requirement for frequent changing of air hoses, to remove one that has been chafed. This involves a substantial increase in maintenance expenses, and in addition keeps a tractor out of service during the time the air hose replacement is being made.

In view of the difficulties which have heretofore persisted, it is proposed to provide a cage-like structure mountable upon the back of the cab of the tractor and so designed as to keep the hose out of contact with any adjacent portion of the cab or of the trailer.

Another object is to so form the device as to permit it to be capable of manufacture at low cost while still being rugged and easily attachable to a tractor.

Another object is to permit the device to be associated with tractors of conventional design, without requiring any modification or redesign of the adjacent structural components of the tractor or trailer.

Still another object is to incorporate in the device means which will cushion or absorb road shocks, the force of which travels in a direction having a vertical component.

Another object is to provide cushioning or absorbent means in the device which will similarly compensate for shocks incurred in a direction having a horizontal component.

Still another object is to provide a device which will automatically swing to right or left as necessary with the adjacent, leading end of the tractor whenever there is relative pivotal movement of the tractor and trailer.

Other objects will appear from the following description, the claims appended thereto, and from the annexed drawing in which like reference characters designate like parts throughout the several views and wherein:

Figure 1 is a fragmentary side elevational view of a tractor trailer combination equipped with a hose cage according to the present invention;

Figure 2 is an enlarged top plan view of the device as seen from the line 2—2 of Figure 1, the dotted line showing the movable component of the device in different positions to which it may swing when in use;

Figure 3 is a side elevational view of the device on the same scale as Figure 2;

Figure 4 is a transverse section on the same scale as Figure 2, taken on line 4—4 of Figure 3;

Figure 5 is a view on the same scale as Figure 3, taken longitudinally through the device on line 5—5 of Figure 2;

Figure 6 is a still further enlarged perspective view of one of the end plates per se; and Figure 7 is an exploded perspective view of the support frame of the device, per se.

Referring to the drawing in detail, generally designated at 10 is a tractor while at 11 there has been designated a trailer. As is usual, there is a fifth wheel plate 13, supporting the leading end of the trailer, with the trailer pivoting upon the plate 13 to provide the above mentioned articulated connection between the tractor and trailer, characteristic of rigs of this type. The air hose connected between the tractor and trailer tends to rub against the adjacent surfaces of the tractor, when this relative pivotal movement occurs and for that matter during ordinary straight driving, due to the fact that road shocks are transmitted to the air hoses, causing the same to vibrate or otherwise move against the adjacent surface of the tractor.

The device constituting the present invention has been generally designated 12 and includes a support bracket 14 of inverted J-shape, having a rearwardly projecting top portion formed at its opposite sides with openings in which are loosely engaged S-hooks 16. Contractile springs 18 are connected between the S-hooks and the back wall of tractor 10 above bracket 14. The depending longer leg of the bracket is fixedly secured by bolts 20 to the back wall of the cab. The springs aid in reducing vibratory motion of the rearwardly projecting portion of the bracket during normal operation of the vehicle.

Generally designated 21 is a support frame including a pair of L-shaped components oppositely arranged as shown in Figure 7 and connected to define a C-shaped, rearwardly opening, vertically elongated support frame 21. The upper L-shaped member 22 of frame 21 includes an elongated, vertical leg having a longitudinal series of apertures 23. Extending through selected apertures 23 are connecting bolts 24, extending also through openings 25 (see Figure 5) of the shorter leg of bracket 14. Nuts 26 are applied to the bolts, and cotter pins 28 extend through openings of the bolts in engagement with the nuts. The registering openings 23, 25 are smooth-walled. Compression coil springs are interposed between the member 22 and the heads of the bolts 24 as shown at 30, normally biasing the bolts rearwardly.

Thus, frame 21, instead of having a rigid connection to bracket 12, has a shock-absorbent type of connection thereto. The frame 21 is held firmly against the bracket 14 under normal circumstances, but is free to move rearwardly from bracket 14, with the springs 30 compressing as necessary, when heavy road shocks, the force of which extends in a direction having a horizontal component, are imparted to the device.

Designated at 32 is the second L-shaped member, comprising the remaining component of the frame 21. This has longitudinally spaced openings 33 registrable with selected openings 23 to receive bolts 34 fixedly connecting the vertical legs in the members 22, 32 to each other.

Designated at 36, 38 are horizontally, rearwardly projecting end portions of the members 22, 32. These have vertically aligned openings, slidably engaging the end portions of a vertical support rod 40. Horizontally disposed connector plates 42 have front ends apertured to receive the extremities of the rods 40 above and below, respectively, the rearwardly projecting extensions 36, 38. Interposed between the extensions 36, 38 and their respective plates 42 are compression coil springs 44 circumposed about the end portions of the rod 40. Cotter pins 45 are applied to the end portions of the rod 40 to hold the parts in assembled relation.

It will be seen that the springs 44, normally, expand to locate the plates in equidistantly spaced location to the respective extensions 36, 38. However, the rod 40 is adapted to shift vertically, when road shocks are encountered the force of which has a direction with a vertical component. In other words, if for example a shock occurs which tends to shift the plates 42 downwardly, the upper spring 44 would compress as necessary to permit this. If there were a tendency of the plates 42 to move upwardly, the lower spring 44 would compress. The springs thus provide a shock-absorbent connection of the plates 42 to the support frame 21, such that the rod 40 and the plates 42 are free to shift upwardly and downwardly to compensate for road shocks occurring in directions having vertical components.

A pair of identically formed, vertically spaced, circular, thick end plates 46 of rubber material have center openings 47 through which extends the air hose 48. Each end plate 46 has a circumferential series of openings 49 (see Figure 6), these openings being angularly spaced 90° apart about the marginal portion of the end plate 46. Disposed midway between a pair of the openings 49 is another marginal opening 51 receiving a connector bolt 50, on which is threaded a wing nut 52. The wing nuts 52 bear against the plates 42, the bolts 50 securing the plates 42 to the end plate 46.

Designated at 54 are elongated, rigidly constituted, straight parallel connecting rods 54 each of which is threaded at its opposite ends. Rods 54 extend through the openings 49 of the end plates. The rods 54 have heads 58 at one end bearing against the outer surface of the lower end plate. Nuts 56 are threaded upon the rods, one nut 56 bearing against the inner surface of the lower end plate 46, with the heads 58 bearing against the outer surface of said lower end plate. The other nuts 56 bear against the opposite face of the upper end plate. Thus, the end plate can be adjustably spaced, and are fixedly connected in spaced relation by the rods 54, which extend parallel to and are angularly spaced about the portion of the air hose that extends between the end plates. Thus, the rods 54 form a cage-like, protective enclosure for that part of the hose extending through the device.

Referring to Figure 1, the hose 48 is connected to the usual fitting 60 provided upon the air line 62 of the trailer. At its other end, hose 48 is connected to the fitting 64 of the air line of the tractor 10.

Referring to Figure 2, the frame 21 supports the cage assembly 66 defined by end plates 46, connecting rod 54, plates 42 and associated connecting and fastening elements, for swiveling movement about the axis defined by the rod 40. The device freely swivels about this axis, to any extent necessary according to the pull exerted laterally thereon in one or the other direction by the hose responsive to turning of the tractor relative to the trailer during normal operation of the vehicle.

It will be readily apparent from Figure 1 that the device maintains the hose 48 completely out of contact with adjacent structural components of the tractor and trailer. In this way, rubbing of the hose is completely prevented, or if it does occur, at least said rubbing will be so inconsequential as to have no significance. Loss of time which presently results by reason of the requirement of frequent changing of the air hoses, and elimination of the danger of a chafed hose breaking during operation of the truck, are thus eliminated or markedly reduced. All this is achieved, of course, by a cage-like means which not only has the swiveling movement apparent from Figure 2, but also, has various other movements that occur during the shock-absorbent and cushioning action hereinbefore described. The frame 21, for example, can move bodily in a horizontal direction, due to the fact that it is maintained against the bracket 14 by a resilient, yielding means that compresses as necessary to permit the frame 21, and hence all components supported by the frame, to shift to the left in Figure 3 from its normal position shown in this figure of the drawing. Further, the cage assembly 66 has a cushioned up-and-down movement upon the rod 40, that is, upon the axis about which it swivels, with this shock-absorbent action occurring in any position to which the cage means may swivel about said axis. All of this combines to produce a decidedly effective device for preventing the chafing or hoses on trucks. Of course, any number of the devices can be used, according to the number of hoses connected between the tractor and trailer, and in a typical working arrangement, two of the devices would be provided upon a tractor, one for the conventional service line shown at 48 and the other for the emergency line, not shown.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A support structure for a hose of the type connected between traction and trailing vehicles, said structure comprising: a support bracket fixedly mountable on one of said vehicles; a frame connected to said bracket for movement toward and away from the bracket in a generally horizontal direction, said frame being resiliently, yieldably biased toward the bracket; a cage assembly adapted for carrying said hose in a protectively enclosed position; and a shock-absorbent connection between said assembly and said frame.

2. A support structure for a hose of the type connected between traction and trailing vehicles, said structure comprising: a support bracket fixedly mountable on one of said vehicles; a frame connected to said bracket for movement toward and away from the bracket in a generally horizontal direction, said frame being resiliently, yieldably biased toward the bracket; a cage assembly adapted for carrying said hose in a protectively enclosed position; and a shock-absorbent connection between said assembly and said frame, comprising a vertical rod carried by the frame and supporting said assembly, and springs on the ends of the rod interposed between the frame and the respective ends of the case assembly.

3. A support structure for a hose of the type connected between traction and trailing vehicles, said structure comprising: a support bracket fixedly mountable on one of said vehicles; a frame connected to said bracket for movement toward and away from the bracket in a generally horizontal direction, said frame being resiliently, yieldably biased toward the bracket; a cage assembly adapted for carrying said hose in a protectively enclosed position; and a shock-absorbent connection between said assembly and said frame, comprising a vertical rod carried by the frame and supporting said assembly, and springs on the ends of the rod interposed between the frame and the respective ends of the cage assembly, said rod connecting the assembly to the frame for swinging movement upon the frame about a vertical axis defined by the rod.

4. A support structure for a hose of the type connected between traction and trailing vehicles, said structure comprising: a support bracket fixedly mountable on one of said vehicles; a frame connected to said bracket for movement toward and away from the bracket in a generally horizontal direction, said frame being resiliently, yieldably biased toward the bracket; a cage assembly adapted for carrying said hose in a protectively enclosed position; and a shock-absorbent connection between said assembly and said frame, comprising a vertical rod carried by the frame and supporting said assembly, and springs on the ends of the rod interposed between the frame and the respective ends of the cage assembly, said rod connecting the assembly to the frame for swinging movement upon the frame about a vertical axis defined by the rod, said assembly including vertically spaced end plates centrally apertured for extension of the hose therethrough, connecting rods extending between and connecting the end plates, and connecting plates extending laterally from the respective end plates and apertured to receive the first named rod, said springs bearing against said connecting plates.

5. A support structure for a hose of the type connected between traction and trailing vehicles, said structure comprising: a support bracket fixedly mountable on one of said vehicles; a frame connected to said bracket for movement toward and away from the bracket in a generally horizontal direction, said frame being resiliently, yieldably biased toward the bracket; a cage assembly adapted for carrying said hose in a protectively enclosed position; and a shock-absorbent connection between said assembly and said frame, comprising a vertical rod carried by the frame and supporting said assembly, and springs on the ends of the rod interposed between the frame and the respective ends of the cage assembly, said rod connecting the assembly to the frame for swinging movement upon the frame about a vertical axis defined by the rod, said assembly including vertically spaced end plates centrally apertured for extension of the hose therethrough, connecting rods extending between and connecting the end plates, and connecting plates extending laterally from the respective end plates and apertured to receive the first named rod, said springs bearing against said connecting plates, said connecting rods being angularly spaced about the center openings of the end plates to define a cage about the hose.

6. A support structure for a hose of the type connected between traction and trailing vehicles, said structure comprising: a support bracket fixedly mountable on one of said vehicles; a frame connected to said bracket for movement toward and away from the bracket in a generally horizontal direction, said frame being resiliently, yieldably biased toward the bracket; a cage assembly adapted for carrying said hose in a protectively enclosed position; and a shock-absorbent connection between said assembly and said frame, comprising a vertical rod carried by the frame and supporting said assembly, and springs on the ends of the rod interposed between the frame and the respective ends of the cage assembly, said rod connecting the assembly to the frame for swinging movement upon the frame about a vertical axis defined by the rod, said assembly including vertically spaced end plates centrally apertured for extension of the hose therethrough, connecting rods extending between and connecting the end plates, and connecting plates extending laterally from the respective end plates and apertured to receive the first named rod, said springs bearing against said connecting plates, said connecting rods being angularly spaced about the center openings of the end plates to define a cage about the hose, said end plates being formed of a rubber material.

References Cited in the file of this patent

UNITED STATES PATENTS

| | | |
|---|---|---|
| 830,010 | Sanders | Sept. 4, 1906 |
| 1,847,025 | Stockard | Feb. 23, 1932 |
| 2,733,033 | Gunderson | Jan. 31, 1956 |